United States Patent
Yamaguchi et al.

(10) Patent No.: US 8,449,042 B2
(45) Date of Patent: May 28, 2013

(54) ADHESIVE WHEEL BALANCE WEIGHT AND PROCESS FOR PRODUCING THE SAME

(75) Inventors: Yutaka Yamaguchi, Aichi (JP); Osamu Yamaguchi, Aichi (JP)

(73) Assignee: Toho Kogyo Co., Ltd., Aichi (JP)

( * ) Notice: Subject to any disclaimer, the term of this patent is extended or adjusted under 35 U.S.C. 154(b) by 204 days.

(21) Appl. No.: 12/805,613

(22) Filed: Aug. 10, 2010

(65) Prior Publication Data

US 2011/0215635 A1 Sep. 8, 2011

(30) Foreign Application Priority Data

Mar. 5, 2010 (JP) ................................. 2010-049525

(51) Int. Cl.
*F16F 15/32* (2006.01)

(52) U.S. Cl.
USPC ........................................................ 301/5.21

(58) Field of Classification Search
USPC ............................................... 301/5.21, 5.22
See application file for complete search history.

(56) References Cited

U.S. PATENT DOCUMENTS

| | | | |
|---|---|---|---|
| 2,696,408 A | 12/1954 | Merriman | |
| 4,379,596 A * | 4/1983 | Green et al. | 301/5.21 |
| 6,874,856 B2 | 4/2005 | Yoshimura et al. | |
| 7,841,669 B2 * | 11/2010 | Zank | 301/5.21 |
| 7,883,156 B2 * | 2/2011 | Pursley et al. | 301/5.21 |
| 2004/0007912 A1 * | 1/2004 | Amyot et al. | 301/5.21 |
| 2007/0120414 A1 * | 5/2007 | Jenkins et al. | 301/5.21 |

FOREIGN PATENT DOCUMENTS

| | | |
|---|---|---|
| EP | 1128176 A2 | 8/2001 |
| EP | 1327795 A2 | 7/2003 |
| FR | 2909150 A1 * | 5/2008 |
| JP | 2002-13591 A | 1/2002 |
| JP | 2003-314618 A | 11/2003 |
| JP | 2009174712 A * | 8/2009 |

OTHER PUBLICATIONS

Extended European Search Report issued in European patent application No. 10007213.1, dated Mar. 2, 2012.

* cited by examiner

*Primary Examiner* — Kip T Kotter
(74) *Attorney, Agent, or Firm* — Rader, Fishman & Grauer PLLC

(57) ABSTRACT

The present invention provides an adhesive wheel balance weight capable of drastically reducing costs from those of conventional ones, and a process for producing the same. In an adhesive wheel balance weight (W) comprising a weight body (P) and an adhesive tape (T) for attaching the weight body (P) to a vehicle wheel, the weight body (P) comprises a folded weight comprising a folded metal plate piece. The folded weight of the present invention can be formed from a relatively inexpensive raw material sheet at a high yield rate. It is preferable that the raw material sheet is a zinc-coated steel sheet, because no rust-proofing aftertreatment is necessary and therefore further cost reduction is achieved, and its environmental burden is small.

10 Claims, 4 Drawing Sheets

ADHESIVE WHEEL BALANCE WEIGHT AND PROCESS FOR PRODUCING THE SAME

BACKGROUND OF THE INVENTION

1. Field of the Invention

The present invention relates to an adhesive wheel balance weight to be attached to a vehicle wheel in order to correct rotational imbalance, and a process for producing the same.

2. Description of the Related Art

Balance weights are attached to high-speed rotating bodies such as wheels of an automobile or a motorcycle in order to correct imbalance, which becomes a cause of vibrations. These balance weights are roughly classified into two types. One is engaging type (clip-on or hook-on) balance weights in which a weight body is fixed, by engagement, to an outer circumferential edge of a rim of a vehicle wheel. The other is adhesive balance weights in which a weight body is attached to an inner circumferential surface of the rim by a double-sided adhesive tape or the like. Nowadays, highly designed aluminum wheels are increasingly used and in order to maintain their good appearance, adhesive balance weights are often used. Detailed description of such balance weights is shown, for example, in the following Patent Document 1.

Prior Art Documents:

[Patent Document 1] Japanese Unexamined Patent Publication No.2003-314618 (U.S. Pat. No. 6,874,856)

[Patent Document 2] Japanese Unexamined Patent Publication No.2002-13591

By the way, conventional weight bodies used in adhesive wheel balance weights are produced by casting, press-cutting of metal plates, drawing of rods, roll forming of metal plates, or the like. All of these processes, however, have both merits and demerits in terms of yield rate, raw material costs, and processing costs. Therefore, it is difficult to drastically reduce production costs of conventional adhesive balance weights as they are.

Patent Document 2 discloses engaging type wheel balance weights formed by winding or bending elastic metal and integrally having a weight body and an engaging part (a clip). However, engaging type balance weights and adhesive balance weights have substantially little in common in view of technology. Therefore, technical transfer from one to the other or vice versa is difficult in terms of the shape of weight bodies and production processes.

SUMMARY OF THE INVENTION

The present invention has been made in view of these circumstances. It is an object of the present invention to provide an adhesive wheel balance weight which is entirely different from conventional ones in terms of the shape of weight bodies and production processes, and can achieve drastic cost reduction, and to provide a process for producing the same.

The present inventors have earnestly studied in order to solve this problem and, after trial and error, have reached the idea that production costs of adhesive wheel balance weights can be drastically reduced by using a weight body formed by folding a zinc-coated steel sheet. The present inventors have extended this achievement and completed the following present invention.

<<Balance Weight>>

(1) An adhesive wheel balance weight of the present invention comprises a weight body, and an adhesive tape for attaching the weight body to a vehicle wheel, the weight body comprising a folded weight comprising a folded metal plate piece.

(2) In this adhesive wheel balance weight, the weight body which occupies a large part of costs is a metal plate piece formed by folding. A raw material of such a metal plate piece (a metal sheet or plate)is available at low costs and folding a metal plate piece or its raw material is relatively easy. Besides, since a folded weight can be obtained without much wasting a raw material, yield rate can be very high. As a result, costs for producing a weight body or an adhesive wheel balance weight according to the present invention can be reduced drastically.

<<Process for Producing a Balance Weight>>

The present invention can be grasped not only as an adhesive wheel balance weight but also as a process for producing the same. That is to say, the present invention can also be grasped as a process for producing an adhesive wheel balance weight comprising a weight forming step of forming a folded weight comprising a folded metal plate piece, and a weight attaching step of attaching the folded weight to an adhesive surface of an adhesive tape.

BRIEF DESCRIPTION OF THE DRAWINGS

Other objects and features of the invention will become apparent to those skilled in the art as the disclosure is made in the following description of preferred embodiments of the invention, as illustrated in the accompanying sheets of drawings, in which.

DETAILED DESCRIPTION OF PREFERRED EMBODIMENTS

Figure 1:
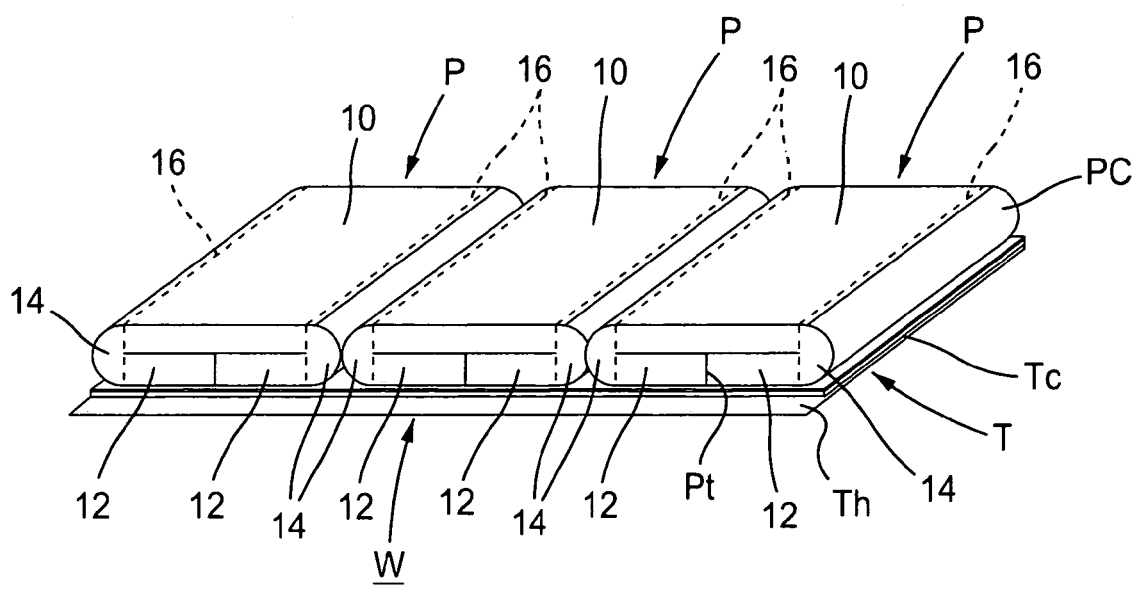
FIG. 1 is a perspective view of an adhesive wheel balance weight according to a first preferred embodiment of the present invention.

The present invention will be described more specifically by way of preferred embodiments. Description of this specification including the following description of preferred embodiments can be appropriately applied not only to an adhesive wheel balance weight but also to its production process according to the present invention. One or more of the following constituent features can be arbitrarily added to the abovementioned constitution of the present invention. A constitutional feature about a production process can be regarded as that of a balance weight when it is understood as a product by process. It should be noted that which embodiment is best varies with target application, required characteristics or the like.

<<Weight Body>>

(1) The material, size or thickness of a weight body or a metal plate piece is not limited. The metal plate piece can comprise a metallic raw material capable of plastic working (bending working) such as pure iron, an iron alloy (e.g., iron and steel), and a zinc alloy. It is preferable to use an iron-based raw material, which causes the least environmental burdens and is available at low costs. Therefore, it is favorable that the metal plate piece is an iron sheet (a pure iron sheet or an iron alloy (except steel) sheet) or a steel sheet.

When the material of the metal plate piece is poor in corrosion resistance, appropriate rust-proofing treatment can be applied after folding. However, if a rust-proofing treatment step is separately provided, the number of production steps and production costs will increase. Therefore, it is preferable that the metal plate piece comprises a raw material sheet which has been treated for rust proof beforehand. For example, if the metal plate piece comprises a zinc-coated steel sheet (a raw material), whose surface has been coated with zinc, that is preferable because no additional treatment for rust proof is necessary and because such a metal sheet is available at relatively low costs.

(2) Although the weight body can be constituted by only one folded body, the weight body is generally constituted by a plurality of folded weights comprising independent small, light-weight pieces in order to facilitate weight adjustment in being attached to a vehicle wheel. Those folded weights can be those obtained by finely cutting a raw material sheet and then individually folding the small metal plate pieces or those obtained by folding a large raw material sheet and then finely cutting the folded sheet into a predetermined size. A variety of shapes and shape forming processes can be employed for each folded weight. For example, the folded weight can be a metal plate piece which has been folded double or more. More than double folding can be accordion folding. The folded-back metal plate piece can be overlapped with itself closely (i.e., can have a layered structure with inner surfaces of the metal plate piece in close contact with each other), or can be overlapped with itself with a small gap between neighboring layers (i.e., can have a layered structure with inner surfaces of the metal plate piece not in close contact with each other). Moreover, the metal plate piece can be folded back equally from both ends thereof or only from one end thereof. When the metal plate piece is folded back from both ends thereof, both the ends can be in contact with each other or can be at a distance from each other.

(3) As mentioned above, only one folded weight is sometimes attached to a vehicle wheel, but often a plurality of folded weights are attached there in a row. In the latter case, it is preferable that the folded weights are disposed on an adhesive tape in a manner that one or more curved portions formed in folding each metal plate piece face a longitudinal direction of the adhesive tape. This is because, when a plurality of folded weights are attached to a curved inner circumferential surface of a vehicle wheel, neighboring two of the densely disposed folded weights may interfere with each other. This phenomenon is more remarkable as the folded weights are attached to a vehicle wheel whose inner circumferential surface has a smaller radius of curvature.

Here, if the curved portions of the folded weights face a longitudinal direction (or an extending direction) of an adhesive tape, the curved portions effectively reduce interference between neighboring two of the folded weights or at least suppress a strong reaction force from generating between the neighboring two of the folding weights, and as a result, attachment of the balance weight to a vehicle wheel is stabilized. The curved portions of the present invention exhibit a similar effect to that of a groove provided for the purpose of interference suppression between neighboring two sections of the weight body in a case of a conventional adhesive wheel balance weight. In contrast to the conventional case, the curved portions of the present invention require no special processing for providing such a groove and do not waste a material for forming such a groove. Therefore, in the present invention, interference suppression can be achieved at the same time with cost reduction. Moreover, owing to the presence of the curved portions, the folding weights can be disposed closer to each other on an adhesive tape, and as a result, functionality as a balance weight can improve. It should be noted that it is preferable to provide curved portions on both ends of a folded weight in a longitudinal direction of an adhesive tape (i.e., in a circumferential direction of a vehicle wheel), but it is effective to provide a curved portion on only one end of a folded weight.

(4) In order to enhance attachability of the folded weights to a vehicle wheel, the folded weights may have a curve corresponding to that of an inner circumferential surface of the vehicle wheel on a side attached to an adhesive tape. Of course, the folded weights may also have a similar curve on an opposite side to the attached side. In terms of appearance, it is preferable that end portions of the folded metal plate pieces lie on a side attached to an adhesive tape. In terms of functionality, however, the end portions of the folded metal plate pieces may lie on an opposite side to the attached side.

(5) As mentioned before, it is preferable to use a metal plate or sheet which has been treated for rust proof beforehand as a raw material of the metal plate pieces. However, when a raw material other than this is used or when a higher rust-proofing effect than that of the rust-proofing treatment beforehand is desired, it is possible to apply metallic coating such as aluminum powder coating, zinc chromate treatment, "GEOMET" (a registered trademark of Metal Coatings International Inc.,a Delaware corporation, located at 275 Industeral Parkway, Chardon, OH) treatment, "MAGNI" (a registered trademark of Magni Group, Inc.,a Michigan Corporation, located at 390 Park Street, Birmingham, MI) treatment, and so on.

<<Adhesive Tape>>

The adhesive tape has an adhesive surface on a side to be attached to a vehicle wheel. At the time of shipment, a sheet of release paper is attached to the adhesive surface, and at the time of use, the sheet of release paper is removed. The folded weights are fixed on an opposite surface to the adhesive surface. The fixing method is not limited. However, in a case of using a double-sided adhesive tape, which is common as an adhesive tape, the folded weights are also attached and fixed to an adhesive surface opposite to the adhesive surface to be attached to a vehicle wheel. It is preferable that this double-sided adhesive tape includes a cushion material. In such a case, small irregularities of the folded weights or an inner circumferential surface of a vehicle wheel are smoothed out by the cushion material, and the folded weights are stably fixed to a vehicle wheel. When a side where end portions of the folded metal plate pieces of the folded weights lie is attached to an adhesive surface of an adhesive tape, it is particularly effective that the adhesive tape includes a cushion material.

<<Production Process>>

Shape forming of the folded weights can be carried out either by cold working or hot working, but cold working is advantageous in view of cost reduction. Examples of the shape forming method include press forming and die forging, and any shape forming method can be employed.

First Preferred Embodiment (1) An adhesive wheel balance weight W according to a preferred embodiment of the present invention (hereinafter simply referred to as the "balance weight W") is shown in FIG. 1. The balance weight W comprises weight pieces P (folded weights) constituting a weight body, and a double-sided adhesive tape T (an adhesive tape). The weight pieces P are formed by preparing metal plate pieces S by cutting a zinc-coated steel sheet of 1.5 mm in thickness (JIS G 3313 "an electrolytic zinc-coated steel sheet") in a rectangle shape of 22 mm in length and 20 mm in width and folding back the metal plate pieces S from both end sides. More specifically, the metal plate pieces S are folded back from both the end sides so that each of the metal plate pieces S is folded back on itself in a two-layered structure with both end portions Pt in contact with each other. Curved portions Pc each having an arc cross section are formed on both sides of each of the weight pieces P.

As illustrated in FIGS. 1-4A and 4C, the weight piece P is a folded weight configured as a folded metal plate piece. The folded metal plate piece has a flat plate main portion 10, a pair of flat plate end portions 12 and a pair of curved portions 14. Respective ones of the pair of curved portions 14 integrally connect the flat plate main portion 10 and respective ones of the pair of the flat plate end portions 12 at respective side edges 16 of the flat plate main portion 10 and the respective ones of the pair of flat plate end portions 12. One of ordinary skill in the art would comprehend that the dashed lines on the drawing figures are imaginary lines that merely represent the respective side edges 16 so that the reader can fully appreciate and comprehend the invention. As a result of this configuration, a unitary construction is formed such that the respective ones of the pair of flat plate end portions 12 and the flat plate main portion 10 are folded relative to each other.

The double-sided adhesive tape T is a tape formed by coating a strong adhesive glue on both surfaces of a base material Tc comprising polyurethane foam. On one adhesive surface (the upper side of FIG. 1) of the double-sided adhesive tape T, a plurality of weight pieces P are disposed and attached with the curved portions Pc close to each other. The other adhesive surface (the lower side of FIG. 1) of the double-sided adhesive tape T is covered with a sheet of release paper Th.

Figure 2:
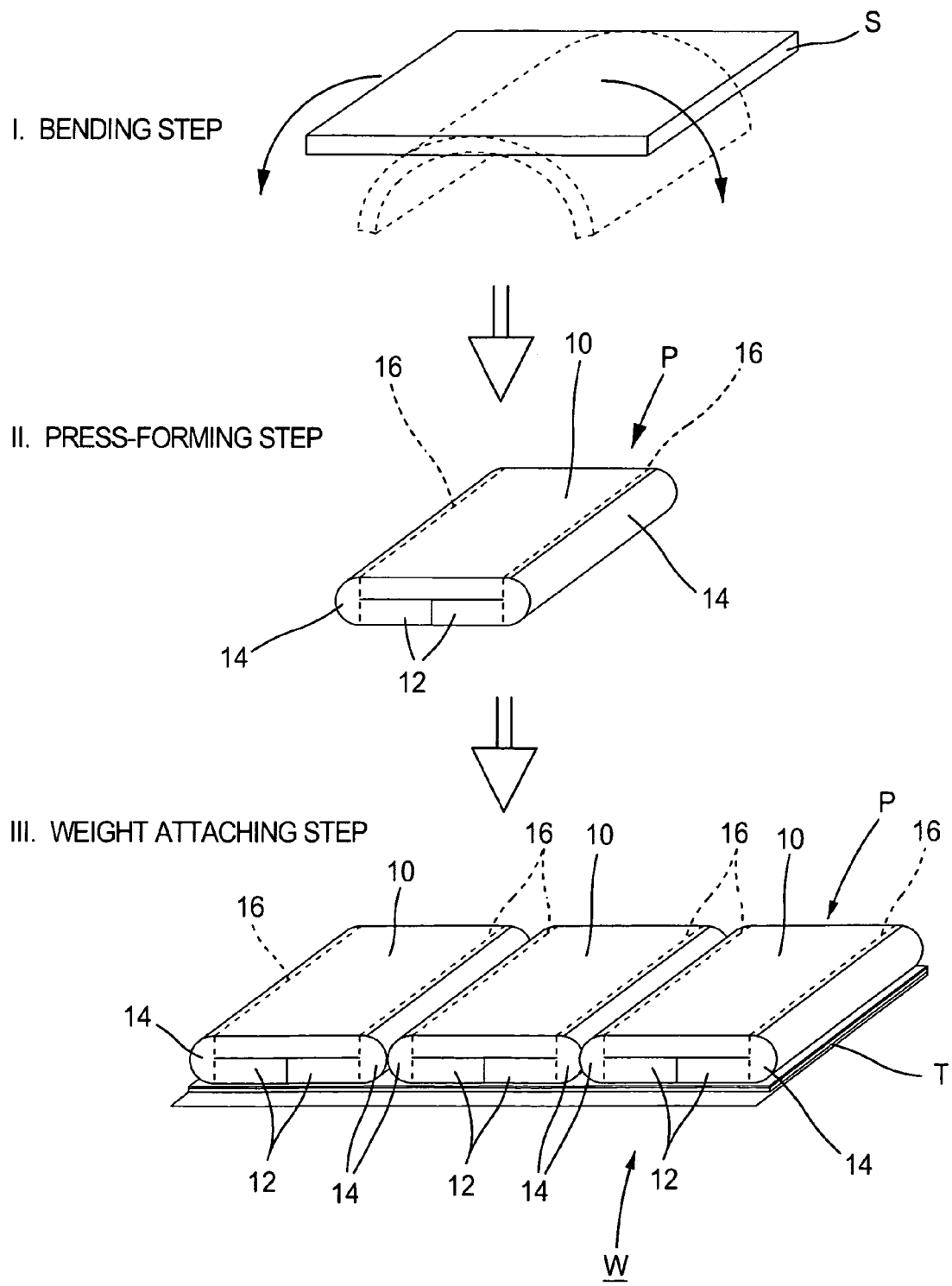
FIG. 2 is a flow chart illustrating a process for producing the adhesive wheel balance weight of FIG. 1.

(2) Process for producing such a balance weight W is shown in FIG. 2. In a step I, both end sides of a metal plate piece S obtained by cutting a metal sheet in a predetermined size are bent toward each other (bending step). In a step II, pressure in vertically opposite directions is applied to the metal plate piece S which has been bent from both the end sides, thereby forming a double-folded weight piece P (press-forming step). In a step III, a plurality of weight pieces P thus obtained are disposed and fixed by adhesiveness on one adhesive surface of a double-sided adhesive tape T (weight attaching step). Thus a balance weight W is obtained. It should be noted that the bending step and the press-forming step constitute the weight forming step of the present invention. It is preferable in view of reduction of production costs that at least one of the bending step and the press-forming step is a cold working step.

Figure 3:
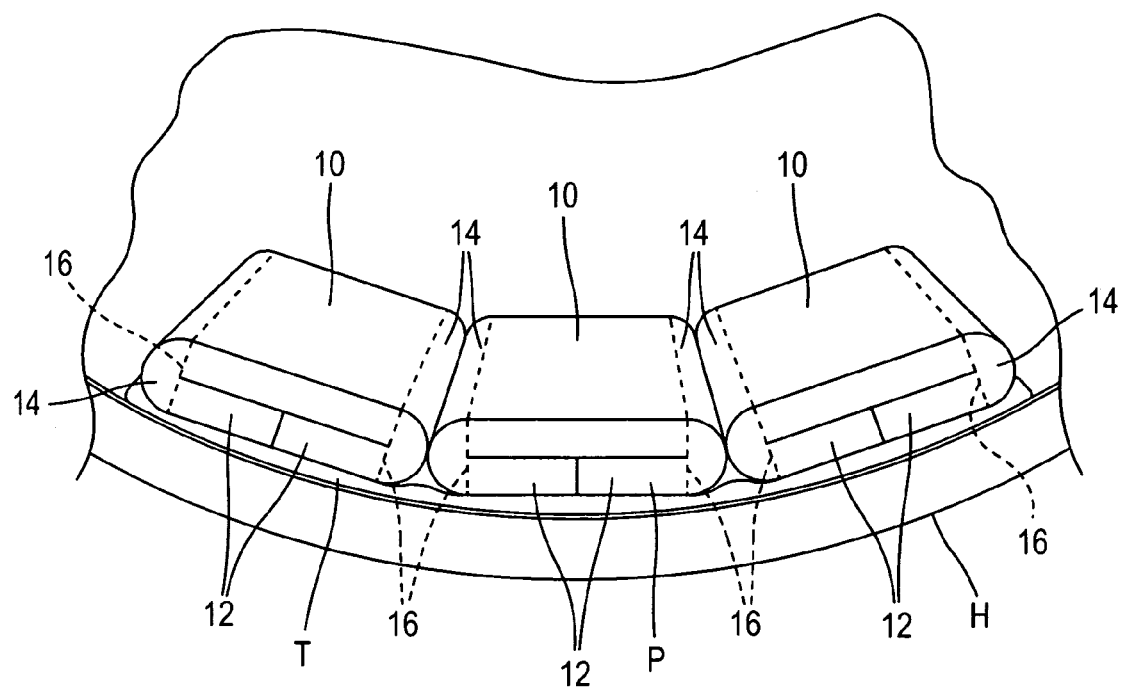
FIG. 3 is a partial view showing that the adhesive wheel balance weight of FIG. 1 is attached, for use, to an automotive aluminum wheel.

(3) Upon removing the sheet of release paper Th from the other adhesive surface, the balance weight W thus obtained can be attached to an inner circumferential surface of a rim of an automotive aluminum wheel H and such an attached state is shown in FIG. 3.

Figure 4A:
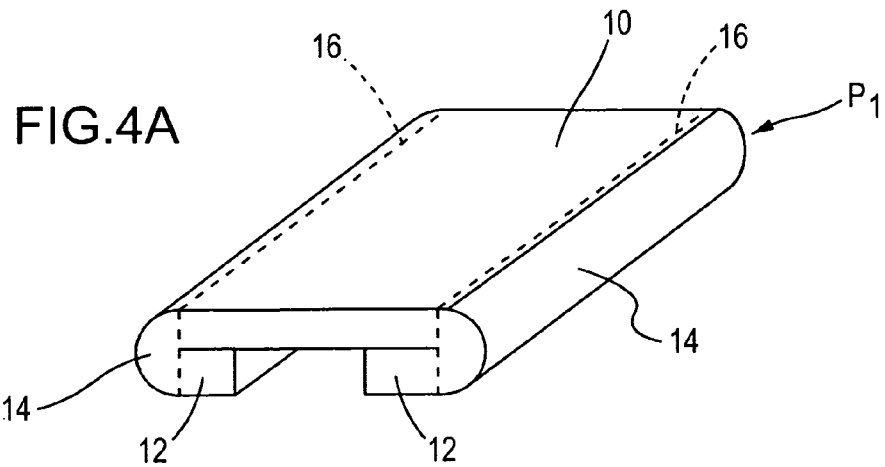
FIGS. 4A, 4B, and 4C are perspective views of folded weights of adhesive wheel balance weights according to other preferred embodiments of the present invention.
Figure 4B:
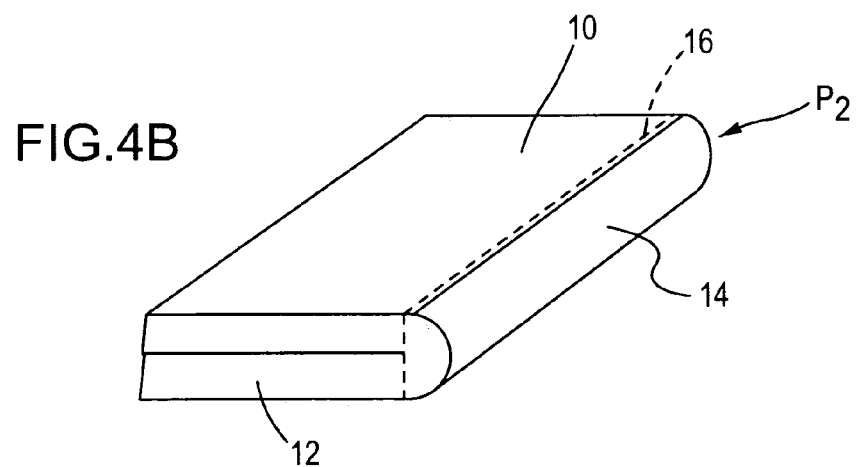
Figure 4C:
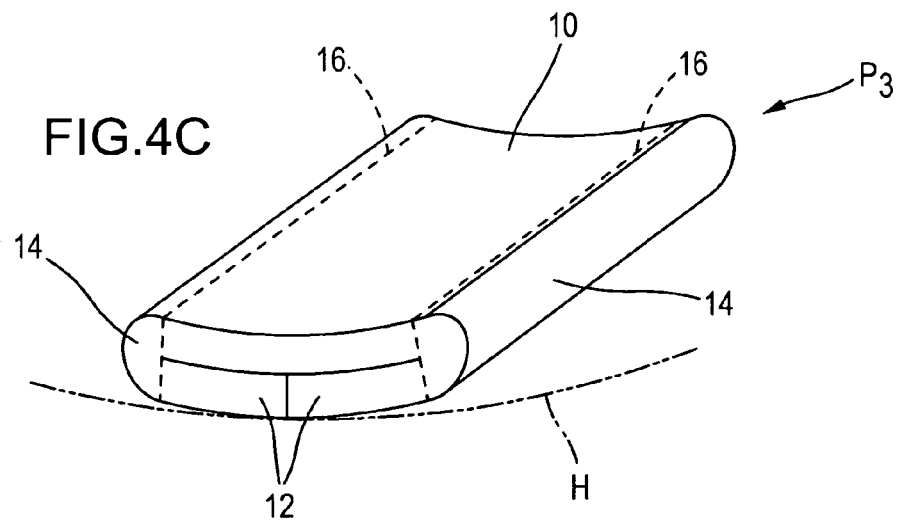

Other Preferred Embodiments (4) The shape of each of the weight pieces P can be those of weight pieces P1 to P3 shown in FIGS. 4A to 4C. The weight piece P1 has a shape in which both end portions of the folded back metal plate piece S are at a distance from each other. The weight piece P2 has a double-folded shape in which the metal plate piece S is folded back on itself along line slightly offset from centerline. By slightly offsetting folding line from the centerline, both ends portions of the metal plate piece S are open upward, and have a similar shape to that of a groove on a conventional balance weight. The weight piece P3 has a surface to be attached to the double-sided adhesive tape T (the lower surface of FIG. 4) which has a radius of curvature corresponding to that of an inner circumferential surface of a rim of an automotive aluminum wheel H.

Obviously, many modifications and variations of the present invention are possible in the light of the above teachings. It is therefore to be understood that within the scope of the appended claims, the invention may be practiced otherwise than as specifically described.

What is claimed is:

1. An adhesive wheel balance weight, comprising:
   a weight body; and
   an adhesive tape that attaches the weight body to a vehicle wheel,
   wherein the weight body is a folded weight configured as a folded metal plate piece having a flat plate main portion, a pair of flat plate end portions and a pair of curved portions, respective ones of the pair of curved portions integrally connecting the flat plate main portion and respective ones of the pair of the flat plate end portions at respective side edges of the flat plate main portion and the respective ones of the pair of flat plate end portions thereby forming a unitary construction with the respective ones of the pair of flat plate end portions and the flat plate main portion being folded relative to each other and with the respective ones of the pair of flat plate end portions being in facial contact with a common surface of the flat plate main portion.

2. The adhesive wheel balance weight according to claim 1, wherein the folded weight is disposed on the adhesive tape in a manner that a curved portion formed in folding the metal plate piece faces a longitudinal direction of the adhesive tape.

3. The adhesive wheel balance weight according to claim 1, wherein the folded weight is the folded metal plate piece closely overlapped with itself.

4. The adhesive wheel balance weight according to claim 3, wherein the folded weight is disposed in a manner that the pair of flat plate end portions of the metal plate piece lie on a side attached to the adhesive tape.

5. The adhesive wheel balance weight according to claim 1, wherein the metal plate piece is an iron sheet or a steel sheet.

6. The adhesive wheel balance weight according to claim 5, wherein the steel sheet is a zinc-coated steel sheet, whose surface has been coated with zinc.

7. A process for producing the adhesive wheel balance weight of claim 1, comprising:
   a weight forming step of forming a folded weight comprising a folded metal plate piece; and
   a weight attaching step of attaching the folded weight to an adhesive surface of an adhesive tape.

8. The process of claim 7, wherein the weight forming step comprises:
   a bending step of bending both end sides of the metal plate piece; and
   a press-forming step of press-forming the metal plate piece after the bending step in a double-folded state.

9. The process of claim 8, wherein at least one of the folding step and the pressforming step is a cold working step.

10. A wheel balance weight, comprising:
    a weight body; and
    an adhesive tape that attaches the weight body to a vehicle wheel,
    wherein the weight body is a folded weight configured as a folded metal plate piece having a flat plate main portion, a pair of flat plate end portions in facial contact with a common surface of the flat plate main portion and a pair of curved portions integrally connecting the flat plate main portion and respective ones of the pair of flat plate end portions at respective side edges of the flat plate main portion and the pair of the flat plate end portions thereby forming a unitary construction.

* * * * *